United States Patent
Marcus et al.

(10) Patent No.: US 6,778,277 B2
(45) Date of Patent: Aug. 17, 2004

(54) APPARATUS AND METHOD TO MEASURE FILM MOTION IN A FILM GATE

(75) Inventors: Michael A. Marcus, Honeoye Falls, NY (US); Kenneth J. Repich, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 440 days.

(21) Appl. No.: 09/864,440

(22) Filed: May 24, 2001

(65) Prior Publication Data

US 2003/0030812 A1 Feb. 13, 2003

(51) Int. Cl.[7] .......................... G01N 21/55; G01B 11/14
(52) U.S. Cl. ...................................... 356/445; 356/614
(58) Field of Search ................................ 356/445, 614, 356/615, 429–431; 382/151; 396/111, 130, 131, 121; 352/140; 353/69, 99, 101; 358/487, 506; 250/201.2, 559.37, 559.01–559.08, 559.29, 559.32; 355/55; 385/12, 14, 15, 24, 116, 147

(56) References Cited

U.S. PATENT DOCUMENTS

| | | | |
|---|---|---|---|
| 3,471,225 A | | 10/1969 | Hutchinson, Jr. |
| 3,617,119 A | * | 11/1971 | Pagel .......................... 352/140 |
| 3,639,048 A | * | 2/1972 | Heaney et al. .............. 353/101 |
| 3,672,757 A | | 6/1972 | Szymber et al. |
| 3,778,545 A | * | 12/1973 | Metzger et al. ............. 348/103 |
| 4,538,062 A | * | 8/1985 | Shishido .................. 250/201.4 |
| 4,800,286 A | | 1/1989 | Brears |
| 5,014,123 A | * | 5/1991 | Imoto ......................... 358/506 |
| 5,317,386 A | | 5/1994 | Marcus et al. |
| 5,392,123 A | | 2/1995 | Marcus et al. |
| 5,483,347 A | | 1/1996 | Hollmann |
| 5,555,092 A | * | 9/1996 | Kaye et al. ................. 348/107 |
| 5,581,351 A | | 12/1996 | Marcus et al. |
| 5,604,533 A | * | 2/1997 | Eiberger ...................... 348/97 |
| 5,650,816 A | * | 7/1997 | Mead ......................... 348/106 |
| 5,943,090 A | * | 8/1999 | Eiberger et al. ............. 348/97 |
| 6,588,904 B2 | * | 7/2003 | Morton et al. .............. 352/228 |

OTHER PUBLICATIONS

M. Marcus, *Robust fiber–optic sensors for process monitoring and control applications*, SPIE, vol. 2836, 1996, pp. 118–129.

* cited by examiner

*Primary Examiner*—Zandra V. Smith
*Assistant Examiner*—Gordon J. Stock, Jr.
(74) *Attorney, Agent, or Firm*—Thomas H. Close

(57) ABSTRACT

Apparatus for measuring deflection of a film in a film gate having an aperture illuminated by a primary light source having an output spectrum, includes: a) a reflective photonic probe mounted in the film gate, the reflective probe having at least one optical fiber; b) a measurement light source coupled to reflective photonic probe and emitting a wavelength of light outside of the primary light source's spectrum; c) a photodetector coupled to the reflective photonic probe; d) a narrow pass optical filter located between the photodetector and the reflective photonic probe, the narrow pass filter passing the light from the measurement light source and blocking the light from the primary light source; and e) signal processing electronics connected to the photodetector for producing a signal representing the motion of the film perpendicular to the plane of the film.

26 Claims, 10 Drawing Sheets

APPARATUS AND METHOD TO MEASURE FILM MOTION IN A FILM GATE

FIELD OF THE INVENTION

The present invention relates to measurement methods, and more particularly to apparatus for measuring the motion of a film in a film gate such as the projection gate of a motion picture projector, scanning gate in a film scanner, or recording gate in a film recorder.

BACKGROUND OF THE INVENTION

During the projection of motion picture film the projected image on the screen can go in and out of focus resulting in momentarily blurred images reducing the picture quality on the projection screen causing discomfort to the viewer. There is a desire to maintain the sharpness of the projected image by keeping the film plane in focus and to eliminate the in and out of focus movement of the film which is objectionable to the viewer. It is known in the art that both thermal and mechanical induced motions will cause the film to go into and out of focus resulting in these undesirable effects.

During motion picture projection, successive film frames are transported intermittently. In a standard 24 frame per second 2 bladed shutter motion picture projection system, each film frame sees an approximately 40 ms cycle divided into four approximately 10 ms events. During the first event a new film frame is advanced and positioned into the film gate while the shutter is closed. During the second event the shutter opens rapidly and the stationary film frame is exposed to high intensity primary light source illumination. During the third event the shutter is closed rapidly and the film frame remains stationary. During the fourth event the shutter is again opened rapidly exposing the stationary film frame to high intensity primary light source illumination for a second time. After the fourth event the shutter is closed and the film is advanced to the next frame and the cycle is repeated.

The mechanical induced motion occurs during the transport event of the projection cycle. When the film is intermittently pulled through the gate, the film moves in and out of the plane defining the rest position. This in and out of the plane motion is called mechanical ringing and typically takes about 30 ms to settle. The thermal induced motion occurs during the second through fourth events. When the shutter is opened the film absorbs radiant energy from the high intensity primary light source and expands, which causes thermally induced motion. The film is heated during the first and second exposures (second and fourth events) and cools when the shutter is closed during the third event.

The current trend in the motion picture industry is to project onto larger screens, which require higher levels of illumination on the film in the projector gate. These higher levels of illumination amplify the undesirable thermal effects. These effects differ from one projector to the next, each projector having its own peculiar characteristics. This problem of thermal and/or mechanical deflection of film in a gate is also experienced in film scanners, film writers, photographic printers, and slide projectors.

Film scanners and film recorders are similar to film projectors in that they have film transport subsystems and high intensity illumination sources. Film projectors, scanners, and recorders require the film to be accurately positioned and include apparatus to maintain positional accuracy during operation. Radiant energy absorbed by the film from the illumination source causes the film to move or buckle. The film transport subsystems, at the component level, introduce mechanical vibrations into the film causing it to move or ring. The film motion characteristic profiles for thermal and mechanical induced motions are critical in order to maintain proper focus calibration with the rest of the optical system. The typical depth of focus requirements for precision film scanners, recorders, and projectors is less than four thousandths of an inch over the field of view. In order to properly design, assemble, align, calibrate, operate, and maintain precision film apparatus, real-time monitoring of the film dynamics is critical to meeting the performance criteria.

Film scanners transport film across a film gate. Typically, they illuminate from one side through the film onto a detector which is located on the other side of the film. The optical subsystem defines the planarity of the film at the film gate. Any motion, thermal and/or mechanical, which causes the film to displace beyond the depth of focus specification will result in a degraded, out of focus image. Real-time accurate film position data provides the opportunity to maintain in-spec performance and ensure optimal image scanning.

Film recorders typically transport film across a writing head in which a precision beam of light writes or exposes a latent image on the light sensitive film. The planarity of the film's surface is required to be controlled within very tight tolerances in order to properly focus the beam on the surface. The resulting image quality is directly dependent on controlling film motion within the depth of focus of the optical system. Real-time accurate film position data provides the opportunity to maintain in-spec performance and ensure optimal image recording.

Thus, there is a need for real time instrumentation to characterize and enable understanding of the thermal and mechanical induced motions of the film as it is transported, illuminated and/or projected in the gate of a motion picture projector, film scanner or film recorder. The resulting knowledge will enable the design of improved motion picture projection systems, scanners and film recorders. For example, use of the instrumentation will enable better construction, alignment and calibration of motion picture projectors, film scanners and film recorders. In addition the same type of instrument can be utilized in the field for maintenance, repair and calibration of motion picture film projectors, film scanners and film recorder. The instrumentation can also be integrated into the motion picture film projector, film scanner or film recorder to provide active monitoring and real time feedback to servo control systems to maintain in-spec focus.

U.S. Pat. No. 3,471,225 issued Oct. 7, 1969 to Hutchison describes an automatic focusing motion picture projector which attempted to measure the buckle of the film at a frame adjacent to the projector film gate. The apparatus includes a light source arranged to project a beam of light at an obtuse angle onto the surface of the film and a split detector arranged to receive the reflected beam from the surface of the film. This arrangement does not actually measure the film deflection in the gate of the projector and does not provide a record of the deflected film as a function of time. The measurement looked for a desired amplitude and controlled a servo mechanism to keep the film at a desired distance. There was no means included to determine the magnitude of the film buckle.

U.S. Pat. No. 3,672,757 issued Jun. 27, 1972 to Szymber et al. discloses a slide projector means for maintaining focus in response to film deflection similar in principle to that of U.S. Pat. No. 3,471,225. U.S. Pat. No. 4,800,286 issued Jan. 24, 1989 to Brears discloses a measurement device for computing distance variations in a corrugated structure with a fiber optic lens probe and a detector sensing reflected light variations from peaks and valleys of the corrugated structure. U.S. Pat. No. 5,483,347 issued Jan. 9, 1996 to Hollmann discloses an apparatus for measuring distance wherein a light source from one fiber optic bundle is focused on a surface and reflected light therefrom is focused through another fiber optic bundle to a detector for calculation of the distance. In this apparatus the fiber optic probe is moved relative to the stationary object surface for calculating distance. U.S. Pat. No. 5,581,351 issued Dec. 3, 1996 to Marcus et al. discloses a method and apparatus for measuring thermal expansion of a rotating roller utilizing a pair of reflective fiber optic probes. U.S. Pat. No. 5,392,123 issued Feb. 21, 1995 to Marcus et al. describes an optical monitor for measuring a gap between a pair of rollers using a plurality of reflective pair fiber optic probes.

None of the above prior art will measure film deflection and dynamics in real time in the gate during the intense illumination from the primary light source present at the gate of a motion picture projector. Therefore, there is a need for an improved apparatus for measuring the out of plane motion of motion picture film traveling through the gate of a motion picture projector during illumination by high intensity optical sources. Furthermore, such an apparatus needs to be self-calibrating, robust, simple to install, be capable of making measurements in real time, and with high measurement reproducibility on the order of 1-micron measurement repeatability. Thus, there is a need for improved instrumentation to characterize thermal and mechanical induced deflections of motion picture film as it is transported, illuminated and projected in the gate of a motion picture projector.

SUMMARY OF THE INVENTION

The need is met according to the present invention by providing apparatus for measuring deflection of a film in a film gate having an aperture illuminated by a primary light source having an output spectrum, that includes:

a) a reflective photonic probe mounted in the film gate, the reflective photonic probe having at least one optical fiber;

b) a measurement light source coupled to a reflective photonic probe and emitting a wavelength of light outside of the primary light source's spectrum;

c) a photodetector coupled to the reflective photonic probe;

d) a narrow pass optical filter located between the photodetector and the reflective photonic probe, the narrow pass filter passing the light from the measurement light source and blocking the light from the primary light source; and e) signal processing electronics connected to the photodetector for producing a signal representing the motion of the film perpendicular to the plane of the film.

Advantages

The present invention enables the design of improved motion picture projection systems, film scanners and film recorders. Use of the instrumentation will enable better construction, alignment and calibration of motion picture projectors, film scanners and film recorders. In addition the same type of instrument can be utilized in the field for maintenance, repair and calibration of motion picture film projectors, film scanners and film recorders. The instrumentation can also be integrated into the motion picture film projector, film scanner or film recorder to provide active monitoring and real time feedback to servo control systems to maintain in-spec focus.

BRIEF DESCRIPTION OF THE DRAWINGS

FIG. 8 shows typical data measured with the motion picture gate moving without the primary light source on;

DETAILED DESCRIPTION OF THE INVENTION

Figure 1:
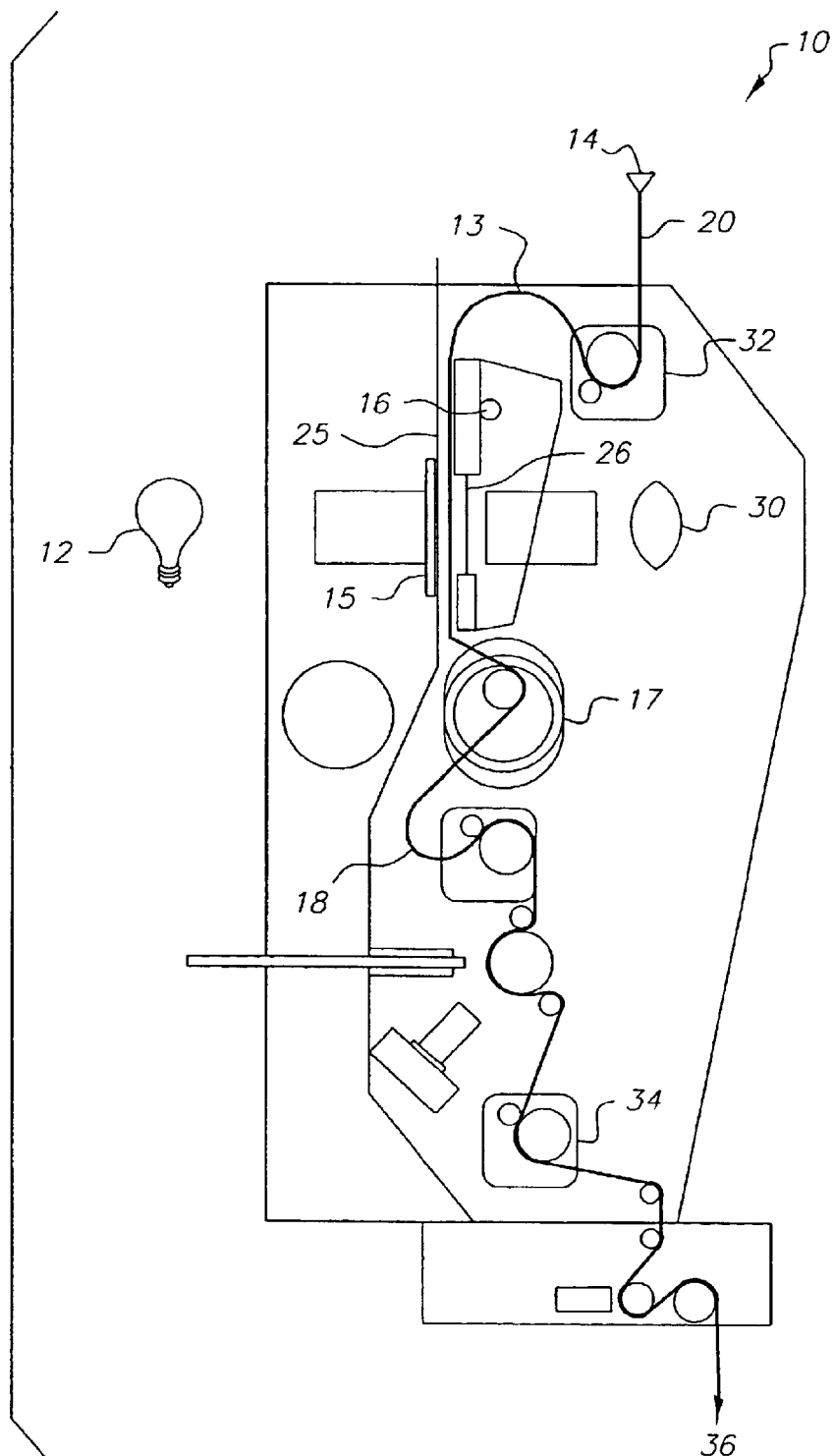
FIG. 1 shows a typical (prior art) motion picture projector highlighting the projector film gate, tensioning control, transport drives, rollers and film path.

FIG. 1 depicts a typical motion picture projector head 10 with a motion picture film 20 threaded through the projector head. A film supply 14 holds the film 20 which is threaded around a supply drive 32, forming an upper loop 13 into a film gate 25, around an intermittent drive 17, down to form a lower loop 18, around the take-up drive 34 where the film is wound onto a film take-up 36. The tension on the film inside the gate is controlled by a film tension control 16. This eliminates slack in the film and provides a flat film surface at the gate aperture, which minimizes lateral and longitudinal film motion and provides for a sharper projected image. The projector primary light source 12 is used to illuminate the motion picture film 20 with a particular primary light source output spectrum usually optimized for a high output over the entire invisible wavelength range. The projector primary light source 12 is held in a projector primary light source housing (not shown) and has a reflector (not shown) mounted in the projector primary light source housing behind the primary light source. The reflector and primary light source are positioned to provide a desired cone of light at a film gate aperture 26. The film is illuminated through the projector gate film aperture 26, which determines the illuminated region of the film. During transport the projector gate film aperture 26 is coincident with the motion picture film image frame, and the projected image passes through lens 30 and is displayed on a projection screen (not shown). A shutter 15 is typically a two bladed device that breaks the projected light beam into two equal time exposures and is timed to the intermittent cycle. The quality of the projected image is dependent on the projector's ability to properly contain the film in the gate during the two time exposures. The intensity of the light beam introduces thermally induced buckling of the film in the gate and causes the film to move in and out of focus.

The motion picture projector outputs a high quality analog image that can be defined by six image parameters: brightness, steadiness, flicker, noise, sharpness, and ghosting. The transport subsystem of the projector, including film tension, contributes to the unsteadiness, noise, and sharpness of the projected image. The magnitude of the primary light source's flux density determines the amount of thermal buckling which results in reduced sharpness, increased unsteadiness, and the amount of perceived flicker.

In order to have complete control over the film during all phases of operation, a complete characterization is needed which isolates mechanical and thermal characteristics. These profiles can be used to provide proper alignments, subsystem timing, tension adjustments, and primary light source focus during initial calibration and for passive and/or active compensation during operation.

Figure 2:
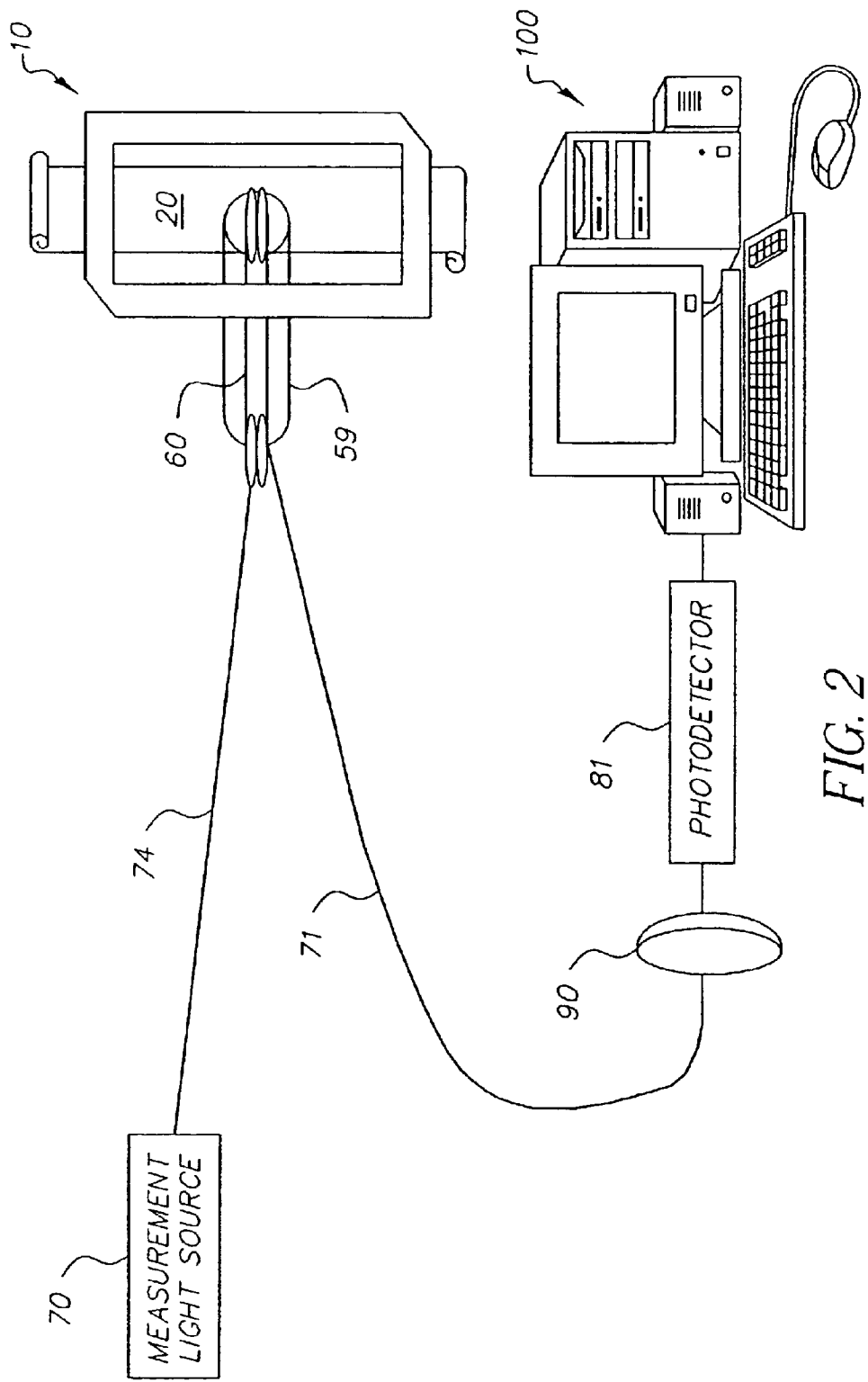
FIG. 2 shows a first schematic of the apparatus according to the present invention used to measure motion picture film motion at the image plane during projection.

FIG. 2 shows a general schematic of the apparatus according to the present invention to measure motion picture film motion at the image plane during projection. A small diameter fiber-optic coupled reflective photonic probe 60 is mounted perpendicular to the film plane of a film 20 in a motion picture projector head 10 in front of the primary light source housing at the film gate. The reflective photonic probe 60 includes a pair of optical fibers 71 and 74, the ends of which are mounted parallel and at a fixed spacing relative to each other in a tubular probe casing 59. A measurement light source 70, preferably a narrow band light source such as a laser, is coupled to an input optical fiber 74 which functions as the input fiber to reflective photonic probe 60.

The ends of fibers 74 and 71 residing in the reflective photonic probe 60 are cleaved and polished flat normal to the fiber axis. It is noted that optical fibers 74 and 71 can either be single optical fibers or fiber optic bundles. Light emanating from probe input optical input fiber 74 comes out within a cone of light determined by the numerical aperture (NA) of the fiber. When a reflective surface is placed below the tip of probe 60, only light reflected off of the reflective surface which falls within the detection fiber's numerical aperture (NA) is collected by the detection optical fiber 71.

When no reflective surface is present, there is no light detected. The observed signal amplitude due to the presence of a reflective surface is dependent on its distance from the probe tip, the reflectivity of the surface, the fiber numerical aperture, the fiber core diameter, the center to center fiber spacing, the light source intensity, and the angle the reflective surface makes with respect to the probe surface. Further details on the design of the reflective photonic probe 60 are found in SPIE Proceedings Vol. 2836, M. A. Marcus, "Robust Fiber Optic Sensors For Process Monitoring And Control Applications", pp. 118–129, 1996. Alternatively, as described in the Marcus paper, the reflective photonic probe 60 can include a single fiber that is used both for input and output.

When the projector primary light source 12 is on and the shutter is open, light incident from the projector primary light source will also be coupled into detection optical fiber 71. A narrow band pass filter 90 placed at the distal end of optical detection optical fiber 71 transmits light from measurement light source 70 while eliminating the majority of the light from the projector primary light source. In order for filter 90 to remove the majority of the light from the projector primary light source, the measurement light source 70 must emit at a wavelength which has minimal overlap with light coming from the projector primary light source.

The light passing through filter 90 is input into photodetector 81. Photodetector 81 converts the portion of the light from measurement light source 70 reflecting off the motion picture film 20 and passing through filter 90 into an analog voltage signal proportional to the light intensity. The analog voltage signal is sent to an analog to digital converter in computer and data acquisition system 100 where it is analyzed as a function of time.

The reflective photonic probe 60 is set up at an appropriate distance in front of the film so that the detected reflected optical signal is a monotonically increasing or decreasing function of distance from the film surface. When the projector is on, the film is transported through the projector's film gate in an intermittent frame-by-frame manner, and the change in location of the film plane is detected continuously as a function of time.

Figure 3:
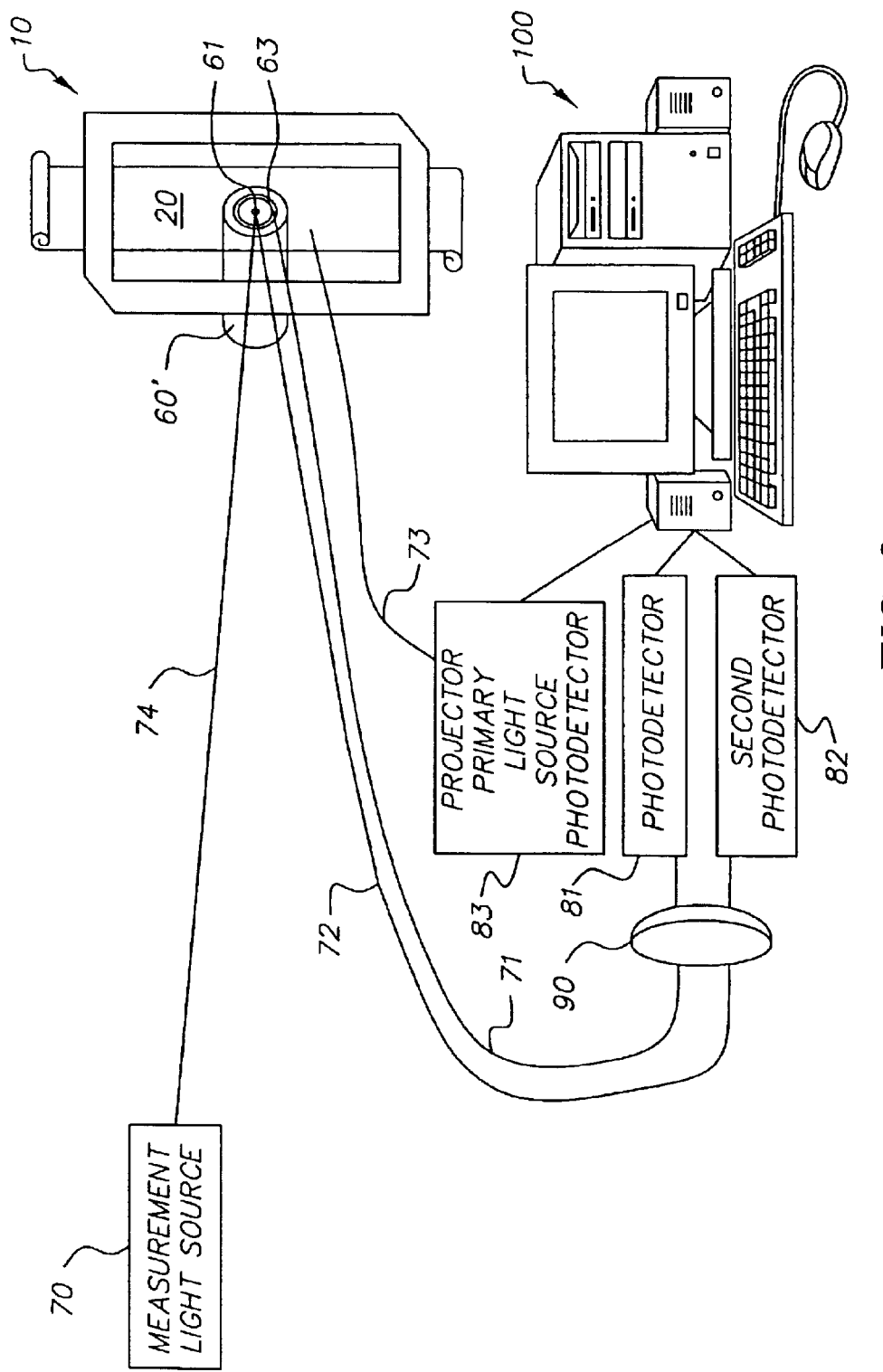
FIG. 3 shows a preferred embodiment for the apparatus shown schematically in FIG. 2.

FIG. 3 shows a schematic of a preferred embodiment of the apparatus used to assess the motion picture film motion at the imager plane of a motion picture projector. The main difference from the embodiment shown in FIG. 2 is that the reflective photonic probe 60' includes a pair of detection optical fibers 71, 72 and a pair of photodetectors 81, 82. This arrangement is called a reflectivity compensated probe. In addition, a separate optical fiber 73 is included to detect light from the projector primary light source that transmits through the motion picture film 20.

The light passing through the projector film gate from the projector primary light source transmitting through optical fiber 73 is detected by projector primary light source photodetector 83. The optical signal detected by projector primary light source photodetector 83 is utilized as an indicator that the projector primary light source housing shutter is open. As before, photodetectors 81, 82 and 83 convert the received optical signals into analog voltage signals proportional to their respective received light intensities. The analog voltage signals are sent to analog to digital converters in the computer and data acquisition system 100 where they are analyzed as a function of time.

Figure 4:
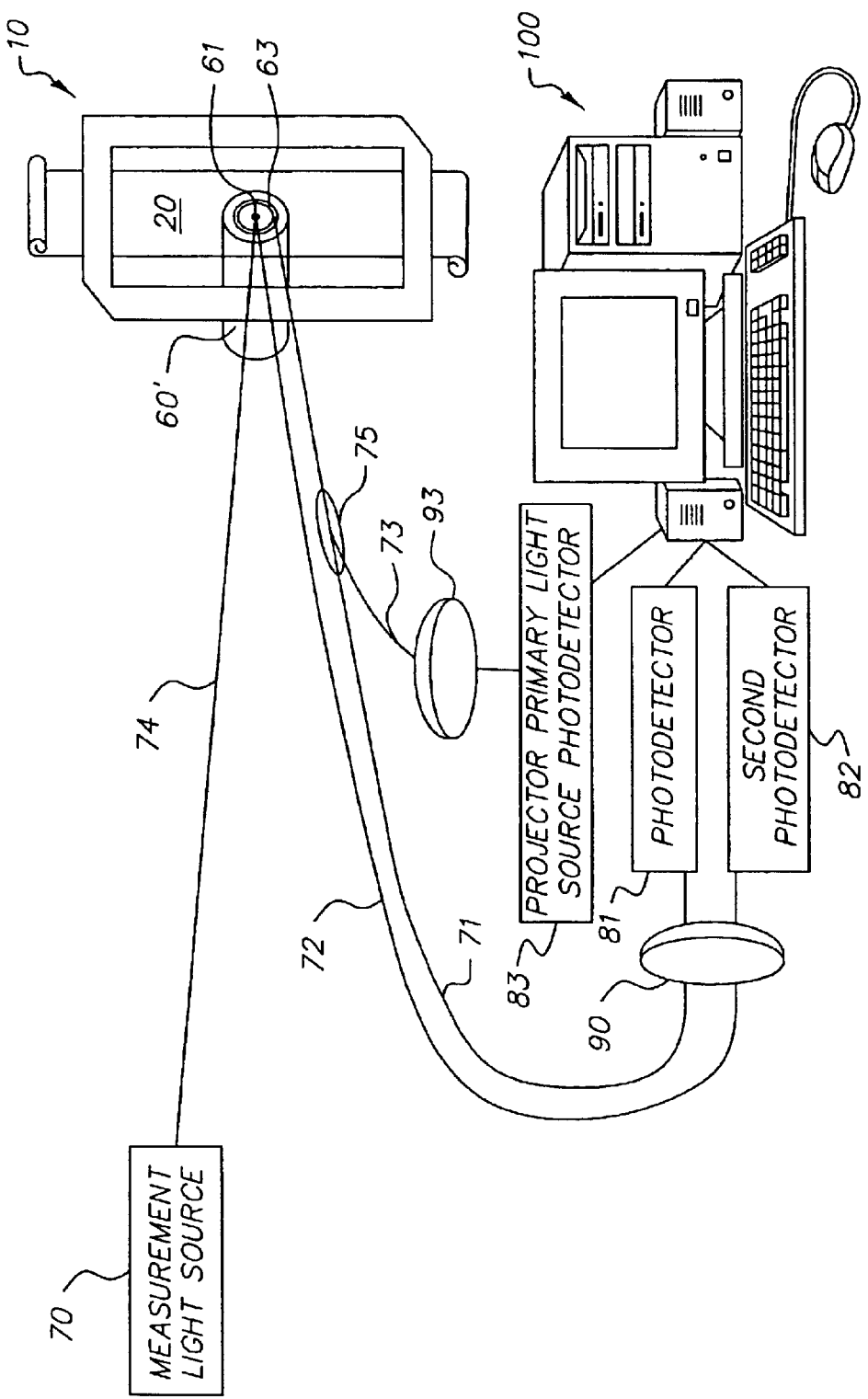
FIG. 4 shows an alternate embodiment for the apparatus shown in FIG. 2.

FIG. 4 shows an alternate preferred embodiment in which the optical fiber 73 is split off from one of the reflective photonic probe detection fibers 72 by a one by two coupler 75. An optional light source notch filter 93 is utilized to remove light from measurement light source 70 so that only light coming from the projector primary light source 12 transmitted through the motion picture film 20 is detected by photodetector 83. The light source notch filter 93 is designed so that it has minimal transmission at the laser wavelength of measurement light source 70 and almost 100 percent transmission everywhere else.

Figure 5:
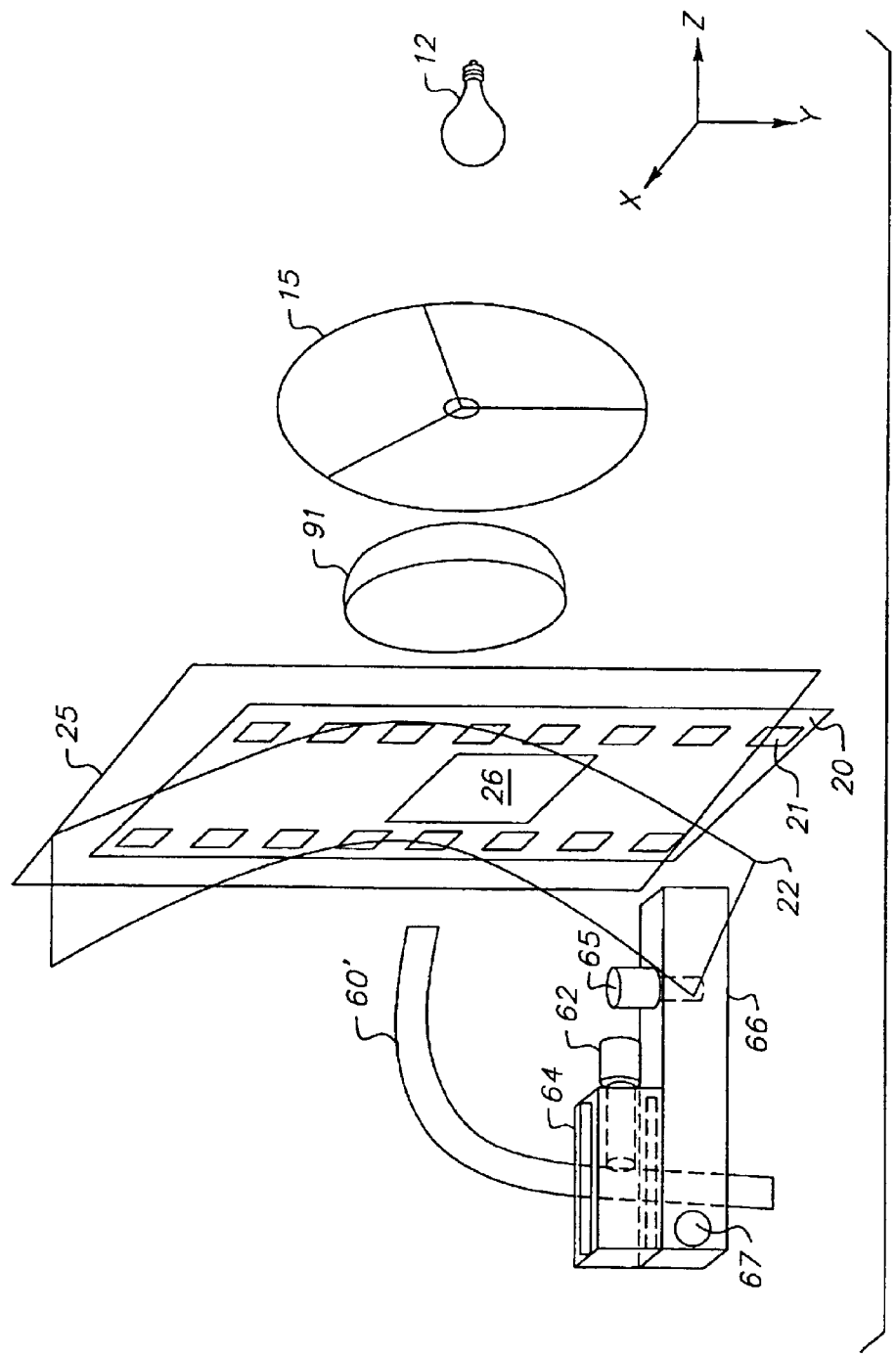
FIG. 5 shows further detail of the fiber optic reflective probe mounted into the projector gate.

FIG. 5 shows the mounting geometry for optical reflective photonic probe 60' into the projector film gate 25. Also shown are projector primary light source 12, projector shutter 15, projector gate film aperture 26, film perforations 21 and the projector gate film clamp 22. The probe to projector gate mounting arrangement also includes a probe to film gate clamp adapter base 66 directly coupled to the projector gate film clamp 22. It also includes a micrometer base 64 with a z-axis micrometer 62 installed in it attached to the probe to film gate clamp adapter base 66 for controlling the z-axis distance of the reflective photonic probe 60' tip from the surface of the motion picture film 20. The probe to film gate clamp adapter base 66 also includes a y-axis micrometer 65 and a x-axis micrometer 67.

Also shown in the bottom right of FIG. 5 is the coordinate system. The z-axis micrometer is used when performing a distance calibration on the reflective photonic probe 60'. The x-axis and y-axis micrometers 67 and 65 are used to map out a distribution of the film motion over the surface of the projector gate aperture 26 during testing. In addition, the signal from the projector primary light source photodetector 83 can be used to map the projector primary light source's 12 flux density distribution on the motion picture film 20 over the area of the projector gate film aperture 26. This data can be utilized to adjust the primary light source housing and primary light source reflector position so as to provide uniform illumination throughout the projector gate film aperture 26. In order to load the motion picture film 20 into the projector film gate 25 the projector gate film clamp 22 tension is released, the film 20 is inserted into guides between the projector gate film clamp 22 and the projector film gate 25 and the tension to the projector gate film clamp 22 is reapplied.

The apparatus shown in FIG. 5 also includes an optional notch filter 91 whose function is to eliminate any residual light at the laser wavelength of measurement light source 70 emitted by projector primary light source 12 before it is transmitted through the film 20. The notch filter 91 is designed so that it has minimal transmission at the laser wavelength and almost 100 percent transmission everywhere else. Its function is identical to that of light source notch filter 93 shown in FIG. 4.

The reflective photonic probe 60' shown in FIGS. 3 and 4 are reflectivity compensated fiber optic probes. They include a pair of detection fiber bundles 71 and 72 with different effective center-to-center distances from the input fiber bundle 74. The reflective photonic probe 60' was designed to provide a monotonically increasing ratio signal as a function of distance from the probe surface with a linear range in excess of 1 mm. In an example probe design, the active probe tip facing the projector gate, has a 0.125" outer diameter (OD). There is a 90-degree bend in the probe with about a 0.70" radius to facilitate right angle mounting into the probe clamp 64. The active probe tip consists of a center fiber bundle 61 with a 46-mil outer diameter surrounded by an outer ring of fibers 63 with a 91-mil diameter. Individual fibers in the fiber bundles are 3.5-mil in diameter with a numerical aperture (NA) of 0.25. The central fiber bundle is randomized and is coupled to two branch tips at the distal end of the fiber probe. One of these branch tips includes input fiber 74 and is coupled to and used for collecting light from measurement light source 70 preferably a laser light source. The second branch tip is coupled to detection fiber 71, which then passes through narrow bandpass filter 90 and into photodetector 81. The outer ring of fibers 63 is coupled to detection fiber 72, which then passes through narrow bandpass filter 90 and into photodetector 82. The active fiber bundle diameters for input fiber 74 and the distal end of detection fiber 71 are 32 mils and the active fiber bundle diameter at the distal end of detection fiber 72 is 81 mils.

Figure 6:
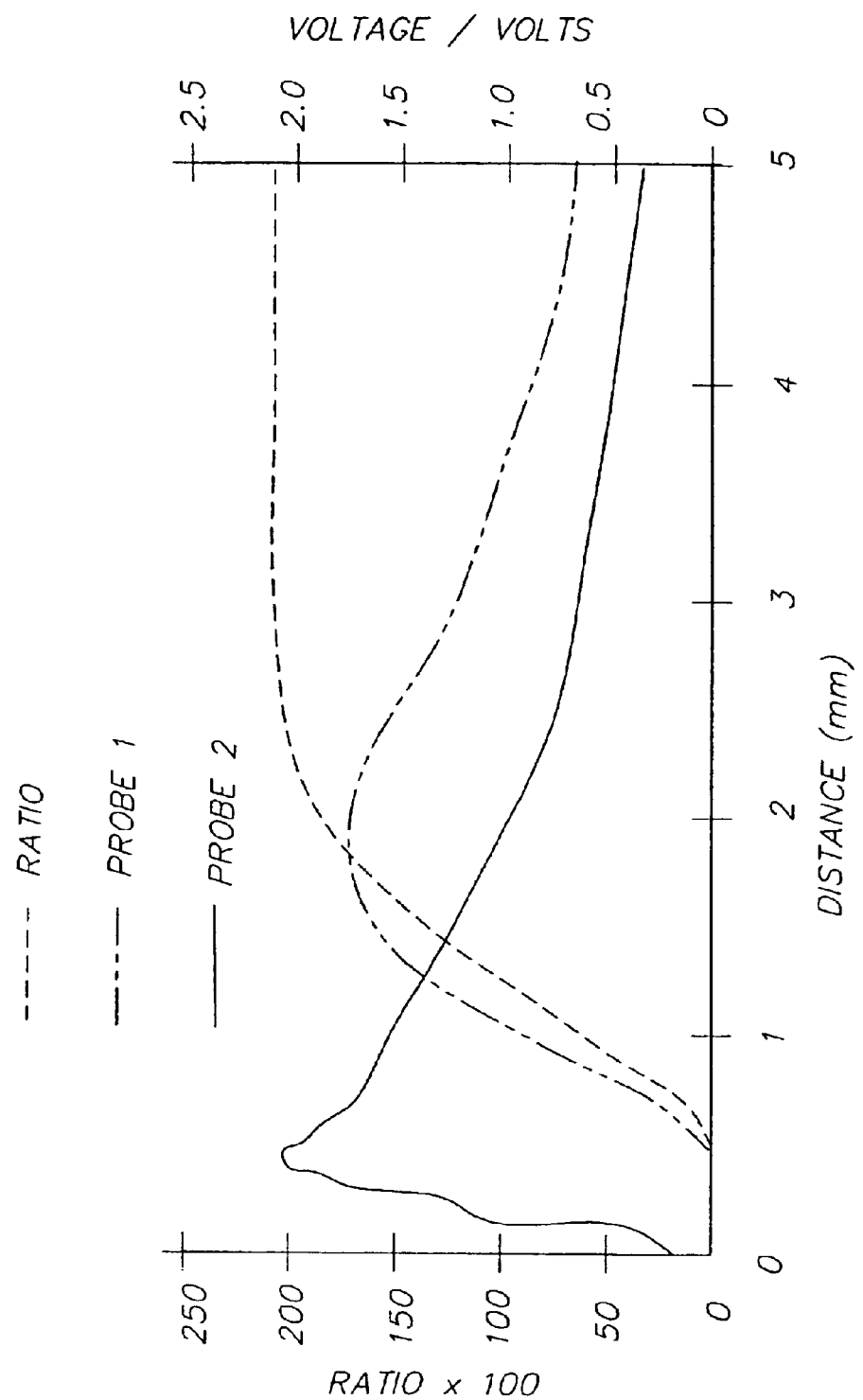
FIG. 6 shows typical calibration curves for the pair of optical fibers shown in FIG. 3 along with the ratio of the two signals for an OD 3 film.

FIG. 6 shows the measured photodetector responses of the inner fiber-optic bundle 61 labeled Probe 2, and outer fiber-optic bundle 63 labeled Probe 1 along with the calculated scaled ratio of the two signals as a function of distance from the motion picture film. The data in the calibration curve is obtained as follows. Using the z-axis micrometer 62 the tip of reflective photonic probe 60' is first brought into contact with film 20 in the projector gate. The probe voltages for the two channels are recorded and converted to digital signal levels using the data acquisition and computer system 100. The probe position is then incremented by a known amount (typically in 50 μm steps) and data is recorded using the data acquisition and computer system 100 and stored in a sequential table of probe voltages as a function of distance. This process is continued until the farthest distance data desired is obtained. The scaled ratio as a function of probe tip distance from the film is then calculated by calculating the ratio of the two probe signals at each measured distance and multiplying them by a constant scaling factor. The scaled ratio data is also displayed in FIG. 6.

Figure 7:
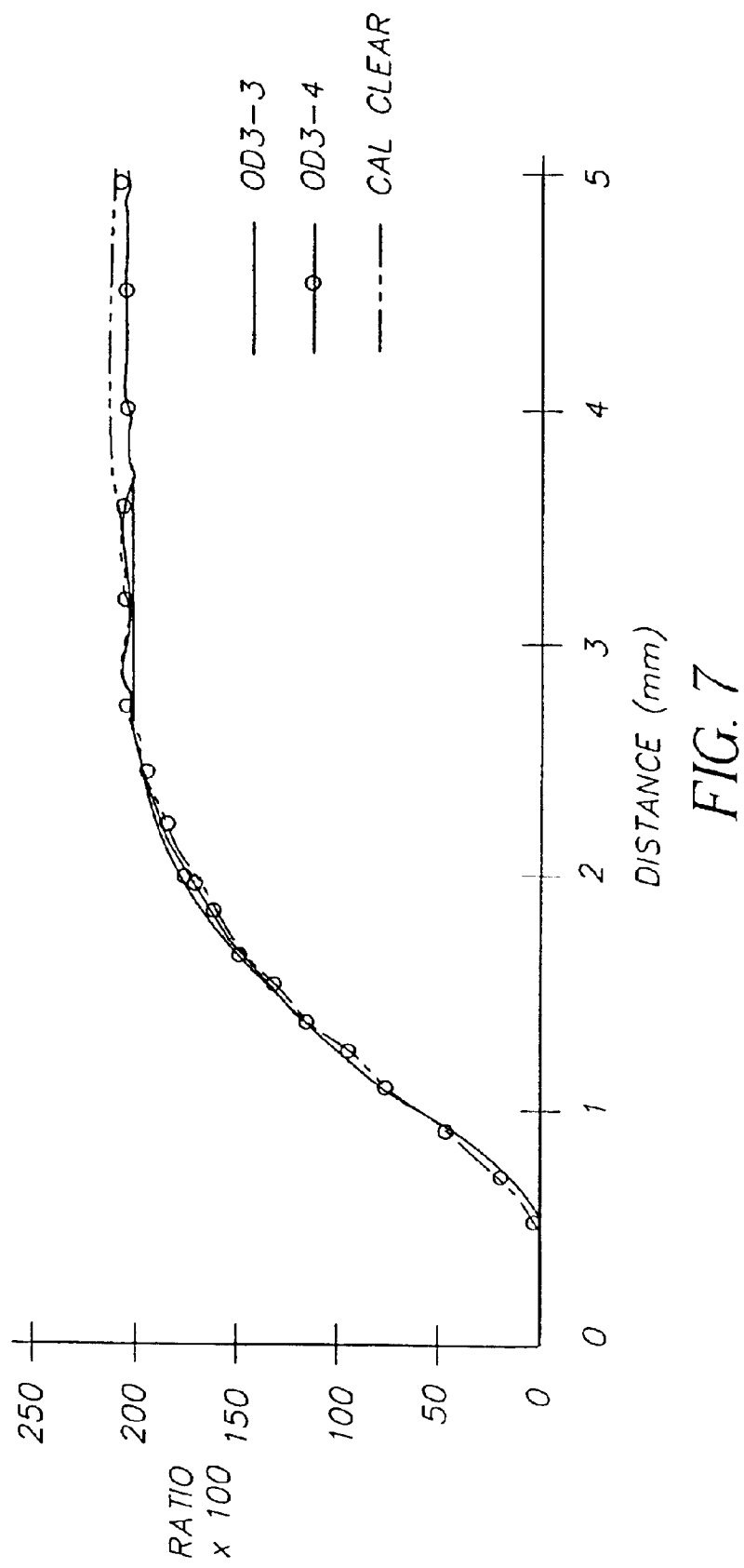
FIG. 7 shows typical ratio calibration curves for a variety of motion picture films.

FIG. 7 shows the measured ratio response for 2 different OD 3 motion picture films and a transparent motion picture film. Note that the ratios as a function of distance for all the films over the range between 0.6 and 2.2 mm are monotonically increasing and are in excellent agreement. This is an example of the results obtained with a reflectivity compensated probe which functions as follows. The individual probe signals Si can be calculated as follows $$S_i = C_i I_o F_{li} R g_i f_i(x) \quad (1)$$

where i is the detection fiber branch 1 or 2, $I_o$ is the incoming light intensity from the measurement light source 70, $C_i$ is the fiber transmission due to coupling loss and fiber transmission percentage, $F_{li}$ is the in-line narrow bandpass filter 90 transmission percentage at the wavelength of the measurement light source 70, R is the reflectivity of the motion picture film 20, $g_i$ is the amplifier gain factor of photodetector 81 or 82, and $f_i(x)$ is the normalized signal response function of the fiber-optic reflective photonic probe detection branch as a function of distance z from the motion picture film 20 surface. The fiber probe signal versus distance function $f_i(x)$ is dependent on the fiber diameter, NA of the fibers and center to center spacing between fibers as well as the number of fibers in the bundle and fiber bundle geometry. As is demonstrated in FIG. 7 the optical probe ratio signal ($S_1/S_2$) is independent of film optical density, film reflectivity and is also independent of light source power.

Figure 8:
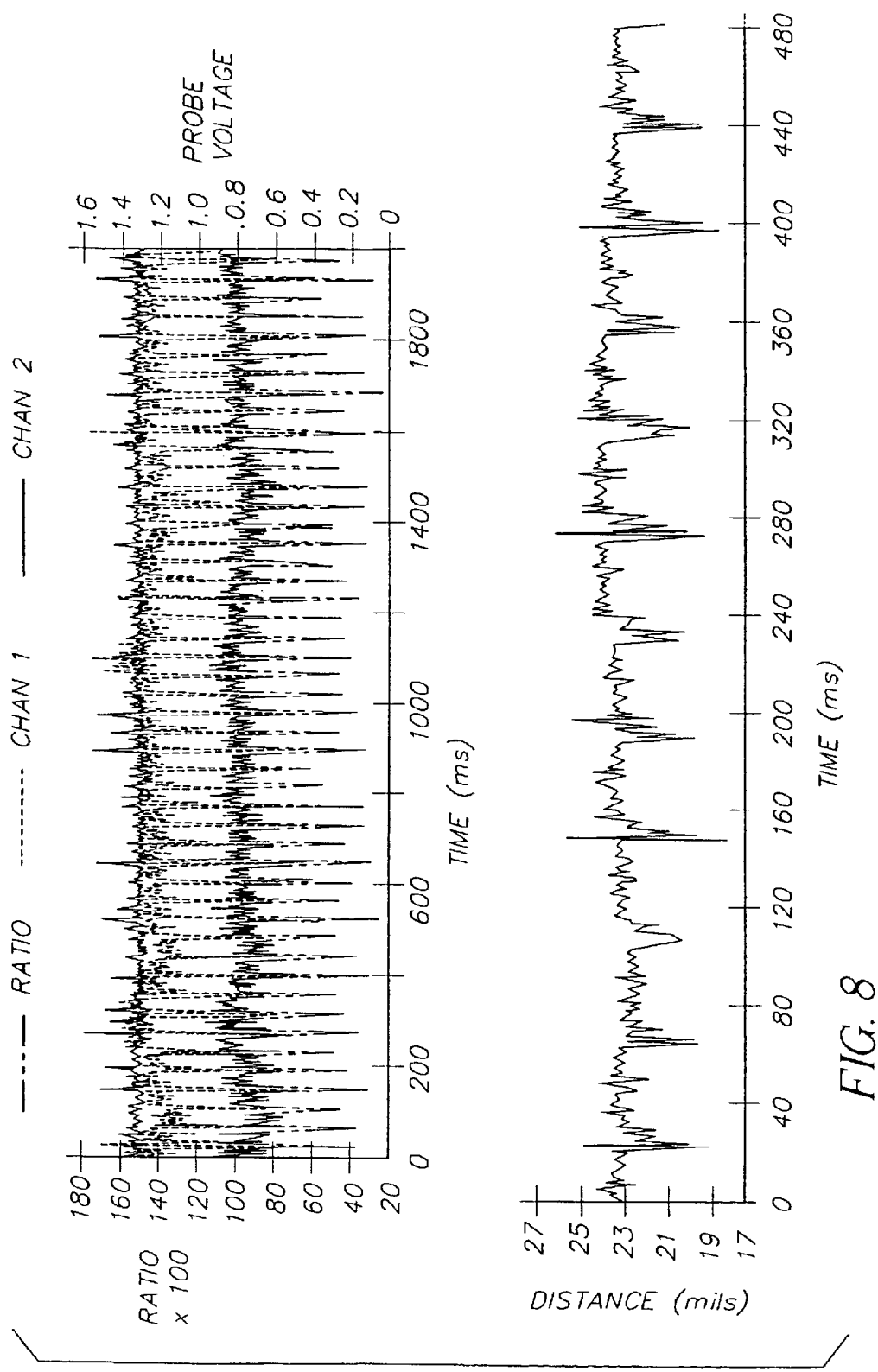

FIG. 8 shows data for a motion picture film being transported intermittently through the gate of a motion picture projector with the primary light source off. In this case, the optical probe mounted in the projector gate is following only the mechanically induced motion of the film. The top trace shows signals of the two probe channels from the reflective photonic probe shown in FIG. 3 as a function of time along with the ratio of the two signals. The bottom trace of FIG. 8 shows the calculated distance as a function of time determined from the ratio signal shown in the top trace of FIG. 8.

The conversion from measured scaled ratio to distance of the reflective photonic probe tip to the film surface is performed as follows. From the calibration data shown in FIG. 6 or 7 we fit the ratio to an equation using regression analysis. For the data shown in FIGS. 6 and 7 we assumed a relationship of the form:

$$z = a + bR + c\sqrt{R} + d/\sqrt{R} + e/R + f/R^2 + g/R^3 + h/R^4 \quad (2)$$

where z is the distance from the probe tip to the film surface, R is the scaled ratio, and a through h are polynomial coefficients calculated during regression analysis. The regression analysis was performed over the distance range from 0.7 mm to 1.8 mm and the best-fit coefficients calculated were found to be:

| a | b | c | d | e | f | g | h |
|---|---|---|---|---|---|---|---|
| 3.3803 | 0.0169 | −0.3403 | −7.3705 | 0.6451 | 31.6312 | 7.3209 | 2.0367 |

In order to convert from measured probe voltages to distance values shown in the bottom trace of FIG. 8, the ratio data is put into equation 2 and the distance values are calculated using the values for coefficients a through h determined by regression analysis from the calibration curve data as summarized in the above table.

The distance data shown in the bottom trace of FIG. 8 shows a transient disturbance at about 40 msec intervals followed by a transient decay of this disturbance which rings for about 20–30 msec. This transient disturbance is coincident with the intermittent film motion of moving from one frame to the next adjacent frame in the projector gate. The magnitude of the transient disturbance and the time that it takes for the disturbance to level off are mainly determined by film tension, the acceleration profile of the intermittent drive mechanism and sprocket teeth/film interface in the film transport system of the motion picture projector head 10. This data can be utilized to appropriately tension the film by adjusting film tension control 16 so that the mechanical induced disturbances are minimized.

By measuring the magnitude of mechanical deflection of the film in the gate at a plurality of tensions, an optimum tension that produces a minimal deflection can be determined. A desired phase relationship between a film advance mechanism and a shutter in the projector can also be determined from the measurement of the mechanical deflection. Furthermore, by performing a fast Fourier transform to measure the main frequency components and amplitudes of mechanical deflection of the film in the gate, one can determine which component of the projector contributed to the deflection. The determined component can then be adjusted to control the amplitude of the mechanical motion.

Figure 9:
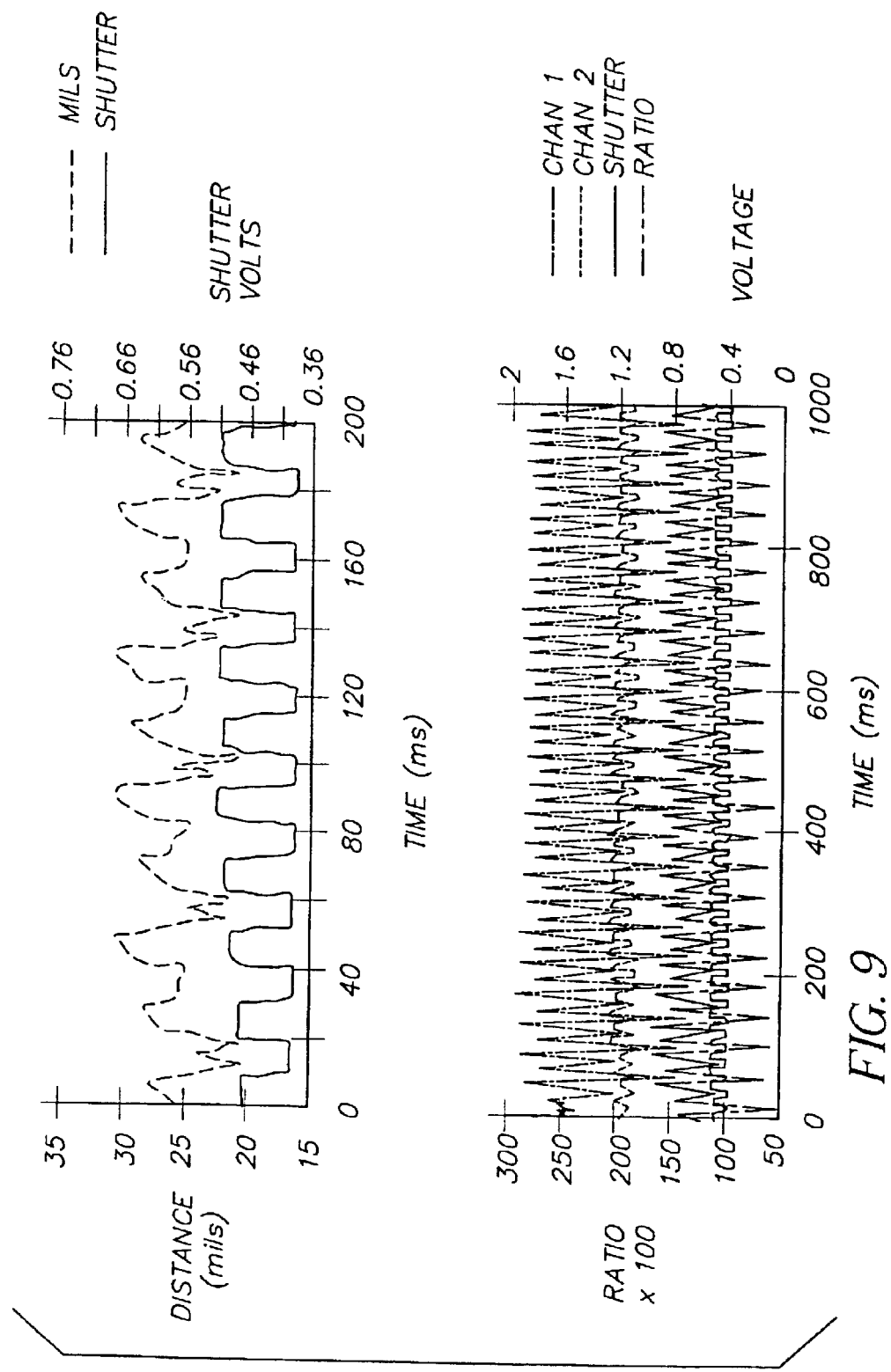
FIG. 9 shows typical data with motion picture projector primary light source and shutter active.

FIG. 9 shows data for the same film when the projector primary light source is turned on and the shutter is functioning normally. The top graph in FIG. 9 shows the calculated distance from the probe to the film surface as a function of time along with the signal from photodetector 83, which provides a signal indicating when the shutter is open. When the voltage on the shutter signal is high, the shutter is open; and when the voltage is low, then the shutter is closed. The bottom trace in FIG. 9 shows the raw data used to derive the distance data shown in the top trace of FIG. 9. From the shutter signal shown in the top trace of FIG. 9, it is observed that the shutter is alternately opened and closed at approximately 10 msec intervals. At the first shutter open to closed transition shown in the top trace of FIG. 9, occurring at about 10 msec, the film moves intermittently from one frame to the next adjacent frame. This is accompanied by the mechanical motion which occurs between 10 and 20 msec as described above with respect to FIG. 8. At 20 msec the shutter is opened and the film is exposed to the intense radiation from the projector primary light source which induces a thermal motion occurring between 20 and 30 msec and causes the motion picture film to buckle towards the projector primary light source 12. Between 30 and 40 msec the shutter is again closed and the thermally induced motion relaxes. Between 40 and 50 msec the shutter is again opened and a second exposure to the intense radiation from the projector primary light source ensues and further thermal buckling occurs and causes the film to move even closer to the projector primary light source. At 50 msec the shutter is again closed and the film is advanced intermittently to the next frame where combined thermal relaxation and intermittent mechanical motion occur. The entire cycle then repeats.

By collecting multiple frames of data with the primary light source off, which provides mechanical ringing data only, and then collecting multiple frames of data with the primary light source alternately on and off which provides mechanical ringing plus thermal buckling data, we can separate the mechanical and thermally induced buckling components of the signal. This is done by subtracting the data obtained with the primary light source off from the data obtained with the primary light source on. By measuring the amplitude of the thermally induced buckling at a plurality of light intensities, a light intensity level which produces the brightest, sharpest image can be determined, thereby taking advantage of any non-linearities in the thermally induced buckling behavior of the film. Furthermore, a mechanical component of the projector, such as film tension, can be adjusted to reduce the amplitude of the thermally induced buckling.

In a preferred embodiment, the y-axis and x-axis micrometer stages would be computer controlled so that the distribution of mechanical ringing and thermal buckling of the motion picture film 20 could be studied over the entire motion picture projector gate aperture 26. The primary light source spectral distribution can be characterized in terms of flux density profile by adding selective filtration to fiber 73.

Figure 10:
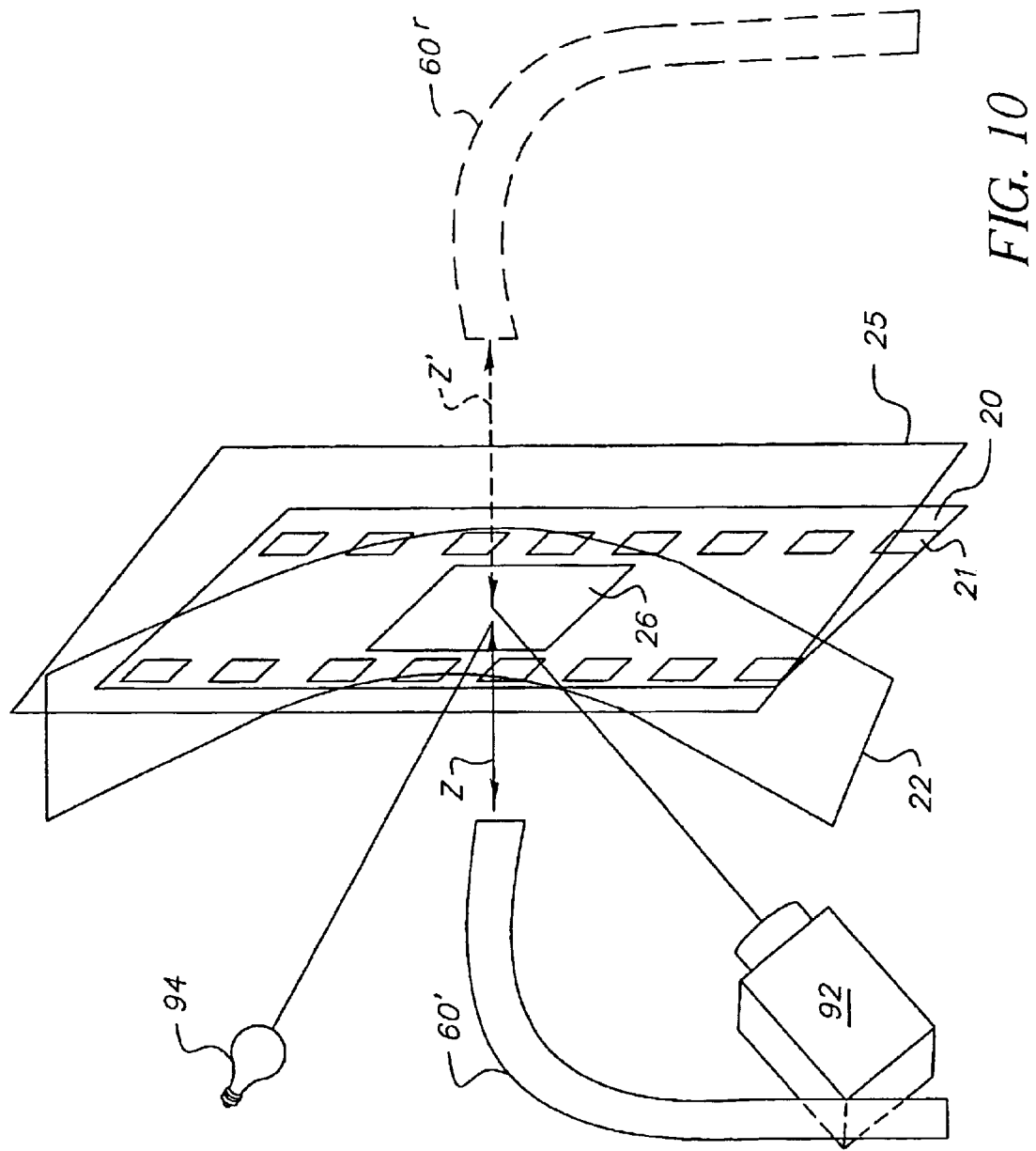
FIG. 10 shows a high speed video camera looking at the film in the projector film gate at an oblique angle together with the optical probe.

Referring to FIG. 10, a high-speed video camera 92 can be placed at a 10–30° angle from the film plane of the motion picture film 20 to detect the location of the tip of the optical probe and the apparent location of the probe reflection as shown in FIG. 10. When utilizing the high-speed video camera 92 an external light source 94 is utilized to illuminate the probe tip of reflective photonic probe 60' and the motion picture film 20 in the projector gate film aperture opening 26. If the motion picture film 20 is partially reflective then a virtual image of the photonic probe 60' will occur in the image produced by the high-speed video camera 92. In general, the reflective photonic probe's tip will be located a distance z from the surface of the motion picture film 20 and the virtual image 60" will be located a distance z' from the surface of the motion picture film 20. The two distances z and z' are equal in magnitude, and the distance from the tip of the reflective photonic probe 60' to the surface of the motion picture film 20 is calculated to be (z+z')/2.

The change in distance between the apparent location of the tip of reflective photonic probe 60' and the virtual image of the photonic probe 60" can be monitored as a function of time using the high-speed video camera 92. This can only be performed if the motion picture film 20 is at least partially reflective. In order to calibrate the distance motion, a measurement would be made at a distance z+z' and then the z-axis micrometer would be incremented by a known amount i, and the 2 data sets compared. The apparent distance shift in the video image would be 2i for these two data sets. Alternatively, the known diameter of reflective photonic probe 60' can be used to provide a calibration factor. The reflective photonic probe 60' data and the high-speed video 92 complement each other.

Dynamic response of the film due to high intensity illumination is successfully measured in real time using these techniques even in the presence of high heat loads from high intensity illumination (7 KW).

The invention has been described in detail with particular reference to certain preferred embodiments thereof, but it will be understood that variations and modifications can be effected within the spirit and scope of the invention. For example the apparatus of the present invention can be used in a laser film recorder or a film scanner such as those used to scan motion picture film to create a digital intermediate. In this case the projector primary light source would be replaced with an appropriate laser source for the particular apparatus.

PARTS LIST

| | |
|---|---|
| 10 | motion picture projector head |
| 12 | projector primary light source |
| 13 | upper loop |
| 14 | film supply |
| 15 | shutter |
| 16 | film tension control |
| 17 | intermittent drive |
| 18 | lower loop |
| 20 | motion picture film |
| 21 | film perforation |
| 22 | projector gate film clamp |
| 25 | film gate |
| 26 | projector gate film aperture |
| 30 | lens |
| 32 | supply drive |
| 34 | take up drive |
| 36 | film take up |
| 59 | probe casing |
| 60 | reflective photonic probe |
| 60' | reflective photonic probe |
| 60$^r$ | virtual image of reflective photonic probe |
| 61 | center fiber bundle |
| 62 | z-axis micrometer |
| 63 | outer fiber bundle |
| 64 | micrometer base and probe clamp |
| 65 | y-axis micrometer |
| 66 | probe to film gate clamp adapter base |
| 67 | x-axis micrometer |
| 70 | measurement light source |
| 71 | detection optical fiber |
| 72 | second detection optical fiber |
| 73 | optical fiber |
| 74 | input optical fiber |
| 75 | one by two coupler |
| 81 | photodetector |
| 82 | second photodetector |
| 83 | projector primary light source photodetector |
| 90 | filters |
| 91 | notch filter |
| 92 | high speed video camera |
| 93 | light source notch filter |
| 94 | external light source |
| 100 | computer and data acquisition system |

What is claimed is:

1. Apparatus for measuring deflection of a film in a film gate having an aperture illuminated by a primary light source having an output spectrum, comprising:
   a) a reflective photonic probe mounted in the film gate, the reflective probe having at least one input output fiber and at least one detection optical fiber cleaved and polished flat normal to their fiber axes and mounted parallel and at a fixed spacing relative to each other, and;
   b) a measurement light source coupled to the reflective photonic probe and emitting a wavelength of light outside of the primary light source's spectrum;
   c) a photodetector coupled to the reflective photonic probe;
   d) a narrow bandpass filter located between the photodetector and the reflective photonic probe, the narrow bandpass filter passing the light from the measurement light source and blocking the light from the primary light source; and
   e) signal processing electronics connected to the photodetector for producing a signal representing the deflection of the film in the film gate as a function of time.

2. The apparatus claimed in claim 1, further comprising means for measuring the flux density of the light from the primary light source over the area of the film gate and means in the signal processing electronics for correlating the measured flux density with the signal representing motion of the film.

3. The apparatus claimed in claim 1, further comprising a notch filter located between the primary light source and the film gate for filtering out light of the measurement light source wavelength.

4. The apparatus claimed in claim 1, wherein the reflective photonic probe is mounted on a translation stage.

5. The apparatus claimed in claim 4, wherein the reflective photonic probe is a reflectivity compensated probe having first and second detection optical fibers.

6. The apparatus claimed in claim 4, wherein the translation stage is an X,Y,Z translation stage and the signal processing electronics includes means for performing a calibration using the Z translation of the translation stage.

7. The apparatus claimed in claim 5, wherein the translation stage is an X,Y,Z translation stage and the signal processing electronics includes means for performing a calibration using the Z translation of the translation stage and means for determining the ratio of the signals collected by the first and second detection optical fibers.

8. The apparatus claimed in claim 1, wherein the film gate is in a projector that includes a shutter and wherein the apparatus includes means for producing a signal representing the shutter motion.

9. The apparatus claimed in claim 1, wherein the film gate is in a film scanner and the primary light source is a laser.

10. The apparatus claimed in claim 1, wherein the film gate is a recording gate of a film recorder.

11. The apparatus claimed in claim 8, wherein the signal processing includes means responsive to the signal representing shutter motion for separating the signal representing the motion of the film into thermal and mechanical components.

12. The apparatus claimed in claim 8, further comprising a high speed video camera for simultaneously capturing real and reflected motion images of the reflective photonic probe, whereby the real and reflected motion images of the reflective photonic probe can be correlated to the signal representing the deflection of the film.

13. The apparatus claimed in claim 9, further comprising a high speed video camera for simultaneously capturing real and reflected motion images of the reflective photonic probe, whereby the real and reflected motion images of the reflective photonic probe can be correlated to the signal representing the deflection of the film.

14. The apparatus claimed in claim 10, further comprising a high speed video camera for simultaneously capturing real and reflected motion images of the reflective photonic probe, whereby the real and reflected motion images of the reflective photonic probe can be correlated to the signal representing the deflection of the film.

15. A method of measuring the deflection of a film in a film gate having an aperture illuminated by a primary light source having an output spectrum, comprising the steps of:

a) mounting a measurement apparatus in the film gate, the measurement apparatus having:
  1) a reflective photonic probe having at least one input optical fiber and at least one detection optical fiber cleaved and polished flat normal to their fiber axes and mounted parallel and at a fixed spacing relative to each other;
  2) a measurement light source coupled to reflective photonic probe and emitting a wavelength of light outside of the primary light source's spectrum;
  3) a photodetector coupled to the reflective photonic probe;
  4) a narrow bandpass filter located between the photodetector and the reflective photonic probe, the narrow bandpass filter passing the light from the measurement light source and blocking the light from the primary light source; and
  5) signal processing electronics connected to the photodetector for producing a signal representing the deflection of the film in the film gate as a function of time; and
b) measuring the deflection of the film with the measurement apparatus.

16. The method claimed in claim 15, further comprising the steps of providing a high speed video camera for simultaneously capturing real and reflected motion images of the reflective photonic probe and correlating the captured images with the signal representing the deflection of the film.

17. The method claimed in claim 15 wherein the reflective photonic probe includes first and second detection optical fibers and is mounted on a translation stage and further comprising the steps of performing a calibration using the translation stage and determining the ratio of the signals collected by the first and second detection optical fibers.

18. The method claimed in claim 15, wherein the deflection is measured with the primary light source off to detect deflection due to mechanical motion of the film.

19. The method claimed in claim 15, wherein the deflection is measured with the primary light source on to detect deflection due to thermally induced buckling of the film.

20. The method of claim 18, wherein the film gate is in a projector having a film advance mechanism and a shutter, and further comprising the steps of determining a desired phase relationship between a film advance mechanism and a shutter in the projector from the measurement of the mechanical deflection.

21. The method of claim 18, further comprising the steps of:
  a) measuring the magnitude of mechanical deflection of the film in the film gate at a plurality of tensions; and
  b) determining an optimum tension that produces a minimal deflection.

22. The method of claim 18, further comprising the steps of:
  a) performing a fast Fourier transform on the signal to measure the frequency and amplitude of mechanical deflection of the film in the gate;
  b) determining from the frequency which component of an apparatus containing the film gate contributed to the deflection; and
  c) adjusting a property of the determined component to control the amplitude of the mechanical motion.

23. The method claimed in claim 18, further comprising the steps of:
  a) measuring the deflection of the film with the primary light source on to detect combined mechanical deflection and thermally induced buckling; and
  b) deriving the thermally induced bucking by subtracting the signal with the light off from the signal with the light on.

24. The method claimed in claim 19, further comprising the steps of:
  a) measuring the amplitude of the thermally induced buckling at a plurality of light intensities; and
  b) determining a desired light intensity from the measured buckling amplitudes.

25. The method claimed in claim 19, further comprising the step of:
  a) measuring the amplitude of the thermally induced buckling; and
  b) adjusting a mechanical component of an apparatus containing the film gate to reduce the amplitude.

26. The method claimed in claim 19, further comprising the step of:
  a) measuring the flux density distribution at the film gate; and
  b) adjusting output of the primary light source to provide a desired flux density distribution at the film gate aperture.

* * * * *

UNITED STATES PATENT AND TRADEMARK OFFICE
CERTIFICATE OF CORRECTION

PATENT NO.     : 6,778,277 B2
DATED          : August 17, 2004
INVENTOR(S)    : Michael A. Marcus et al.

It is certified that error appears in the above-identified patent and that said Letters Patent is hereby corrected as shown below:

Column 11,
Line 60, delete "output" and insert -- optical --.

Signed and Sealed this

Twenty-sixth Day of April, 2005

JON W. DUDAS
*Director of the United States Patent and Trademark Office*